United States Patent
Brown et al.

(10) Patent No.: US 10,783,047 B2
(45) Date of Patent: Sep. 22, 2020

(54) FORMING A CONSISTENCY GROUP COMPRISED OF VOLUMES MAINTAINED BY ONE OR MORE STORAGE CONTROLLERS

(71) Applicant: INTERNATIONAL BUSINESS MACHINES CORPORATION, Armonk, NY (US)

(72) Inventors: Theresa M. Brown, Tucson, AZ (US); Nedlaya Y. Francisco, Tucson, AZ (US); Gregory E. McBride, Vail, AZ (US); Carol S. Mellgren, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 16/123,635

(22) Filed: Sep. 6, 2018

(65) Prior Publication Data
US 2020/0081806 A1    Mar. 12, 2020

(51) Int. Cl.
*G06F 11/20* (2006.01)
*G06F 11/14* (2006.01)
(Continued)

(52) U.S. Cl.
CPC .......... *G06F 11/2064* (2013.01); *G06F 3/065* (2013.01); *G06F 3/0619* (2013.01);
(Continued)

(58) Field of Classification Search
CPC ............. G06F 11/2064; G06F 11/1451; G06F 11/2082; G06F 3/0619; G06F 3/0631;
(Continued)

(56) References Cited

U.S. PATENT DOCUMENTS 6,567,888 B2    5/2003    Kedem
7,225,190 B2 *  5/2007    Iwamura ............. G06F 11/2064
(Continued)

OTHER PUBLICATIONS

U.S. Appl. No. 15/611,569, filed Jun. 1, 2017, (18.706).
(Continued)

*Primary Examiner* — Paul Contino
(74) *Attorney, Agent, or Firm* — David W. Victor; Konrad Raynes Davda & Victor LLP

(57) ABSTRACT

Provided are a computer program product, system, and method for forming a consistency group comprised of volumes maintained by one or more storage controllers. At least one storage controller is caused to perform reservation operations for point-in-time copies of storage units to allocate storage resources and a data structure for a point-in-time copy. Upon successfully completing the reservation operations for all the point-in-time copies, Input/Output (I/O) operations to the storage units of the point-in-time copies are suspended. If I/O operations were successfully suspended at the storage units for all of the point-in-time copies, then suspension of I/O operations is ended I/O operations are allowed to continue at the storage units of the point-in-time copies. The point-in-time copies at the storage units are formed at which the suspension of I/O operations was ended after being successfully suspended. The point-in-time copies are consistent as of a same point-in-time.

26 Claims, 5 Drawing Sheets

(51) Int. Cl.
*G06F 3/06* (2006.01)
*G06F 9/50* (2006.01)

(52) U.S. Cl.
CPC .......... *G06F 3/0631* (2013.01); *G06F 3/0659* (2013.01); *G06F 3/0683* (2013.01); *G06F 9/5005* (2013.01); *G06F 11/1451* (2013.01); *G06F 11/2082* (2013.01); *G06F 2201/84* (2013.01); *G06F 2209/5014* (2013.01)

(58) Field of Classification Search
CPC ...... G06F 3/065; G06F 3/0659; G06F 3/0683; G06F 9/5005; G06F 2201/84; G06F 2209/5014

See application file for complete search history.

(56) References Cited

U.S. PATENT DOCUMENTS

| | | | |
|---|---|---|---|
| 7,543,110 | B2 | 6/2009 | Stolowitz |
| 8,010,495 | B1 | 8/2011 | Kuznetzov et al. |
| 8,055,938 | B1 | 11/2011 | Chatterjee et al. |
| 8,533,397 | B2 | 9/2013 | Bar-El et al. |
| 8,549,225 | B2 | 10/2013 | Blinick et al. |
| 8,713,272 | B2 | 4/2014 | Agombar et al. |
| 8,850,106 | B2 | 9/2014 | Benhase et al. |
| 8,938,428 | B1 | 1/2015 | Ozekinci et al. |
| 9,471,499 | B2 | 10/2016 | Brown et al. |
| 9,558,072 | B1 | 1/2017 | Mam |
| 9,600,375 | B2 | 3/2017 | Dain et al. |
| 9,600,377 | B1 | 3/2017 | Cohen et al. |
| 9,626,115 | B2 | 4/2017 | Dain et al. |
| 9,652,333 | B1* | 5/2017 | Bournival ............. G06F 3/0647 |
| 9,658,798 | B2 | 5/2017 | Ash et al. |
| 9,733,862 | B1 | 8/2017 | Klemm et al. |
| 9,817,724 | B2 | 11/2017 | Dain et al. |
| 9,852,198 | B1 | 12/2017 | Kuznetzov et al. |
| 9,857,962 | B2 | 1/2018 | Yui et al. |
| 9,857,996 | B2 | 1/2018 | Wilkinson |
| 9,927,980 | B1 | 3/2018 | LeCrone et al. |
| 10,013,361 | B2 | 7/2018 | Mannenbach et al. |
| 10,289,322 | B2* | 5/2019 | Brown ................. G06F 3/0619 |
| 2004/0181639 | A1* | 9/2004 | Jarvis ................. G06F 11/2069 711/161 |
| 2005/0071372 | A1 | 3/2005 | Bartfai et al. |
| 2005/0171979 | A1 | 8/2005 | Stager et al. |
| 2006/0106891 | A1 | 5/2006 | Mahar et al. |
| 2008/0155216 | A1 | 6/2008 | Shoham |
| 2008/0222377 | A1 | 9/2008 | Wightwick et al. |
| 2011/0264878 | A1* | 10/2011 | Blea ....................... G06F 3/0683 711/162 |
| 2014/0108756 | A1 | 4/2014 | Brown et al. |
| 2014/0344526 | A1 | 11/2014 | Brown et al. |
| 2015/0081628 | A1 | 3/2015 | Brown et al. |
| 2015/0227432 | A1* | 8/2015 | Jaquette ................ G06F 16/128 707/649 |
| 2015/0227433 | A1* | 8/2015 | Jaquette ............. G06F 11/1448 707/649 |
| 2015/0261678 | A1 | 9/2015 | Gupta et al. |
| 2015/0286424 | A1 | 10/2015 | Dain et al. |
| 2015/0286432 | A1 | 10/2015 | Dain et al. |
| 2015/0286542 | A1 | 10/2015 | Dain et al. |
| 2016/0232102 | A1 | 8/2016 | Ash et al. |
| 2016/0253121 | A1 | 9/2016 | Guo et al. |
| 2016/0259574 | A1 | 9/2016 | Carpenter et al. |
| 2016/0291890 | A1 | 10/2016 | Jennas et al. |
| 2017/0153950 | A1 | 6/2017 | Iwasaki et al. |
| 2017/0161153 | A1 | 6/2017 | Dain et al. |
| 2017/0177443 | A1 | 6/2017 | Figueroa et al. |
| 2018/0136874 | A1 | 5/2018 | Karve et al. |
| 2018/0150229 | A1 | 5/2018 | Brown et al. |
| 2019/0034286 | A1* | 1/2019 | Brown ................. G06F 11/1451 |
| 2020/0081792 | A1* | 3/2020 | Brown ................. G06F 11/1464 |
| 2020/0081806 | A1* | 3/2020 | Brown ................. G06F 11/1451 |

OTHER PUBLICATIONS

U.S. Appl. No. 15/663,727, filed Jul. 29, 2017, (18.714).
U.S. Appl. No. 15/828,288, filed Nov. 30, 2017, (18.719).
U.S. Appl. No. 15/828,302, filed Nov. 30, 2017, (18.746).
Azagury et al.; "Point-In-Time Copy: Yesterday, Today and Tomorrow", IBM Storage Systems Group, 2002, pp. 259-270.
Anonymous, "Data Aware Optimized Backups—Object & System Level", dated Jun. 2, 2016, An IP.com Prior Art Database Technical Disclosure, IPCOM000246384D, Total 7 pages.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pages.
Dufrasne et al., "IBM DS8880 Architecture and Implementation (Release 8.3)", IBM, Nov. 2017, Total 510 pp.
Emc et al.; "Introduction to XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pages.
Lim, S. et al., "Efficient Journaling Writeback Schemes for Reliable and High-Performance Storage Systems", Pers Ubiquit Comput, 17, 2013, 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Taylor, Chris; "Effective Backups: Selecting the Right Backup Mechanism to Match the Business Requirement", Session 16273, pp. 1-62, 2014.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
U.S. Appl. No. 16/123,412, filed Sep. 6, 2018, (18.829).
U.S. Appl. No. 16/123,674, filed Sep. 6, 2018, (18.832).
U.S. Appl. No. 16/123,457, filed Sep. 6, 2018, (18.834).
U.S. Appl. No. 16/123,618, filed Sep. 6, 2018, (18.835).
U.S. Appl. No. 16/123,486, filed Sep. 6, 2018, (18.836).
U.S. Appl. No. 16/123,771, filed Sep. 6, 2018, (18.837).
U.S. Appl. No. 16/123,445, filed Sep. 6, 2018, (18.838).
U.S. Appl. No. 16/123,660, filed Sep. 6, 2018, (18.839).

* cited by examiner

Point-in-Time Copy

Consistency Group

Reservation Command

Freeze Command (check-in)

Thaw Command

FORMING A CONSISTENCY GROUP COMPRISED OF VOLUMES MAINTAINED BY ONE OR MORE STORAGE CONTROLLERS

BACKGROUND OF THE INVENTION

1. Field of the Invention

The present invention relates to a computer program product, system, and method for forming a consistency group comprised of volumes maintained by one or more storage controllers.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When creating a point-in-time copy relationship, the storage controller will freeze Input/Output (I/O) operations while the data structures are being created and resources allocated to make sure there are no writes during this time. When everything is created for the point-in-time copy relationship, then the I/O operations may be allowed to continue so that any data updated will be part of the consistency group being created.

There is a need in the art for improved techniques for creating point-in-time copies of storage units, such as volumes.

SUMMARY

Provided are a computer program product, system, and method for forming a consistency group comprised of volumes maintained by one or more storage controllers. At least one storage controller is caused to perform reservation operations for point-in-time copies of storage units, wherein a reservation operation allocates storage resources and a data structure for a point-in-time copy. A determination is made as to whether the reservation operations successfully completed for all the point-in-time copies. Suspension of Input/Output (I/O) operations to the storage units of the point-in-time copies is caused in response to determining that all of the reservation operations for all of the point-in-time copies successfully completed. A determination is made as to whether I/O operations were successfully suspended at the storage units for all of the point-in-time copies. An end to the suspension of I/O operations and allow I/O operations to continue at the storage units of the point-in-time copies are caused in response to determining that I/O operations were successfully suspended at the storage units for all the point-in-time copies. The point-in-time copies at the storage units are formed at which the suspension of I/O operations was ended after being successfully suspended. The point-in-time copies are consistent as of a same point-in-time.

With the above embodiment, the time or latency during which I/O requests to volumes involved in a point-in-time copy backup are suspended is reduced by creating a single consistency group comprised of multiple volumes at one or more storage controllers. The above embodiment minimizes the time during which I/O operations are suspended to the volumes during the creation of the point-in-time copies in the consistency group by not suspending I/O operations until after reservation operations to allocate storage resources and data structures for the point-in-time copies are completed, so that during this time, I/O operations may continue. In this way, I/O operations are only suspended after creating all necessary data structures so that the storage controllers are only suspended after all have completed their reservation operations.

In a further embodiment, a command is received to establish a consistency group for the storage units to have data consistent as of a point-in-time of the consistency group. The consistency group is formed in response to forming the point-in-time copies at all of the storage units indicated in the command to establish the consistency group.

With the above embodiment, a single consistency group provides consistency across multiple volumes in multiple storage controllers by forming individual point-in-time copies for all the volumes at the storage controllers. In this way, a single multi-volume consistency group is created by forming consistency groups at the different storage controllers having the volumes included in the consistency group so that data in multiple volumes is consistent as of a same point-in-time.

In a further embodiment, the consistency group for the storage units is indicated as invalid in response to determining at least one of that the reservation operations one of the storage units did not successfully complete, that I/O operations were not successfully suspended at all of the storage units, and that I/O operations cannot proceed after successfully suspending I/O operations at one of the storage units.

With the above embodiment, a consistency group is indicated as invalid and not ensuring that data across all the volumes is maintained consistent as of a point in time if one of the operations required to form the point-in-time copies across the volumes fails, including the reservation operations performed for each volume, suspension of I/O operations to the volumes failed, and ending the suspension.

In a further embodiment, a point-in-time copy is maintained for a storage unit in response to I/O operations proceeding at the storage unit after successfully suspending I/O operations at the storage unit while the consistency group including storage unit is indicated as invalid.

With the above embodiment, if point-in-time copies of certain of the volumes in the consistency group were successfully created but others failed, then even though the consistency group as a whole is invalid, the point-in-time copies for certain of the volumes that succeeded remain in place to maintain data in those volumes consistent as of the point-in-time for the consistency group. In this way, consistency protection is provided for at least a subset of the volumes in the consistency group.

In a further embodiment, the causing the at least one storage controller to perform the reservation operations for the storage units comprises sending a reservation command for each of the storage units to the at least one storage controller managing access to the storage units to cause the reservation operations for the point-in-time copies of the storage units. A reservation operation for a point-in-time copy includes destaging any updated data for a storage unit of the point-in-time copy in a cache of the storage controller to the storage unit in the storage.

With the above embodiment, the reservation operations for the storage units involves destaging writes for each of the storage units, which is one of the most time consuming aspects of establishing the point-0in-time copies. Because I/O operations are allowed to proceed during this process, the most time consuming aspect of forming the point-in-time copies, the destaging. Only after completing all reservation operations, including the destaging of writes, are I/O operations momentarily suspended and then unsuspended after I/O operations to all volumes in the consistency group are simultaneously suspended to complete the formation of the point-in-time copies for the consistency groups.

In a further embodiment, the storage units comprise volumes in storages managed by multiple storage controllers. The causing the suspension of the I/O operations comprises sending one freeze command to each storage controller of the storage controllers to cause the storage controller to suspend I/O operations at all of the volumes of the point-in-time copies maintained by the storage controller.

In a further embodiment, the freeze command includes a data structure indicating volumes managed by a storage controller that are subject to the freeze command to cause the storage controller to suspend I/O operations at all of the volumes indicated in the data structure as subject to the freeze command.

With the above embodiments, a single freeze command to a storage controller can indicate all the volumes at the storage controller subject to the freeze to allow the suspension of I/O operations to all volumes in the consistency group at a storage controller to be accomplished with a single freeze command to optimize operation processing.

In a further embodiment, the storage units comprise volumes in storages managed by multiple storage controllers. The causing the I/O operations to continue at the volumes comprises sending one thaw command to each storage controller of the storage controllers to cause the storage controller to end the suspension of I/O operations and to continue I/O operations at all of the volumes of the point-in-time copies maintained by the storage controller.

In a further embodiment, the thaw command includes a data structure indicating volumes managed by a storage controller that are subject to the thaw command to cause the storage controller to end the suspension of I/O operations and to continue I/O operations at the volumes indicated in the data structure as subject to the thaw command.

With the above embodiments, a single thaw command to a storage controller can indicate all the volumes at the storage controller subject to the thaw to allow the ending of suspension of I/O operations to all volumes in the consistency group at a storage controller to be accomplished with a single thaw command to optimize operation processing.

In a further embodiment, the thaw command indicates a point-in-time comprising the point-in-time at which the point-in-time copies are consistent.

With the above embodiment, the consistency group point-in-time and point-in-time for all the storage unit point-in-time copies is set at the time the thaw command is generated because upon processing the thaw command, the point-in-time copies are activated after the suspending of I/O operations is ended.

In a further embodiment, for each point-in-time copy for a storage unit at which the suspension of the I/O operations failed or processing of the thaw command failed, a command is sent to cause the storage controller managing the storage unit to free any resources reserved as part of a reservation operation for the point-in-time copy at which the suspension of the I/O operations failed or the processing of the thaw command failed.

With the above embodiment, if the thaw operation fails for any of the storage units in the consistency group, then a command is sent to free any resources reserved as part of completing the reservation operations at a volume/storage unit, so that the freed resources made available for other processes and point-in-time copies.

In a further embodiment, for each point-in-time copy for a storage unit at which the suspension of the I/O operations succeeded, a thaw command is sent to cause I/O operations to cease the suspension of I/O operations and allow I/O operations to proceed at the storage unit of the point-in-time copy at which I/O operations were successfully suspended.

With the above embodiment, a thaw command is sent for any volume at which suspension succeeded to end the suspension of I/O and allow the point-in-time copy for that volume to be formed, even if other volumes in the consistency group are not allowed to complete if the suspension of the I/O operations failed. In this way, as many volumes as possible are maintained in a consistency group even if the consistency group as a whole fails.

DETAILED DESCRIPTION

In current art, the time required to establish consistency groups or point-in-time copies for multiple volumes can cause substantial interruptions to I/O processing because I/O operations need to be suspended at the volumes subject to the point-in-time copy creation while the data structures for the point-in-time copies are created. Described embodiments provide improved techniques for reducing the time during which I/O requests to volumes involved in a point-in-time copy backup are suspended by creating a single consistency group comprised of multiple volumes at one or more storage controllers. The described embodiments provide a technique that minimizes the time during which I/O operations are suspended to the volumes during the creation of the point-in-time copies in the consistency group.

With the described embodiments, to form the consistency group with minimal downtime at the storage units included in the consistency group, such as volumes or other logical devices, a command is sent to at least one storage controller to perform reservation operations for point-in-time copies of storage units included in the consistency group. A reservation operation allocates storage resources and a data structure for a point-in-time copy, and destages any updates to data in the storage unit as of the point-in-time of the consistency group, to perform most of the preparation work for the point-in-time copy while still allowing I/O operations to continue against the storage units. Once the reservation completes successfully, the Check-In/Freeze command will suspend I/O operations at the storage unit of the PIT copies. Upon successfully suspending I/O operations at all the storage units, the thaw command is issued to terminate the suspension of I/O operations and I/O operations are allowed to continue at the storage units of the point-in-time copies in response. The point-in-time copies to implement the consistency group are formed and point-in-time data at the storage units is preserved after ending the suspension of I/O operations. This allows all the point-in-time copies to be consistent as of the consistency group point-in-time.

Figure 1:
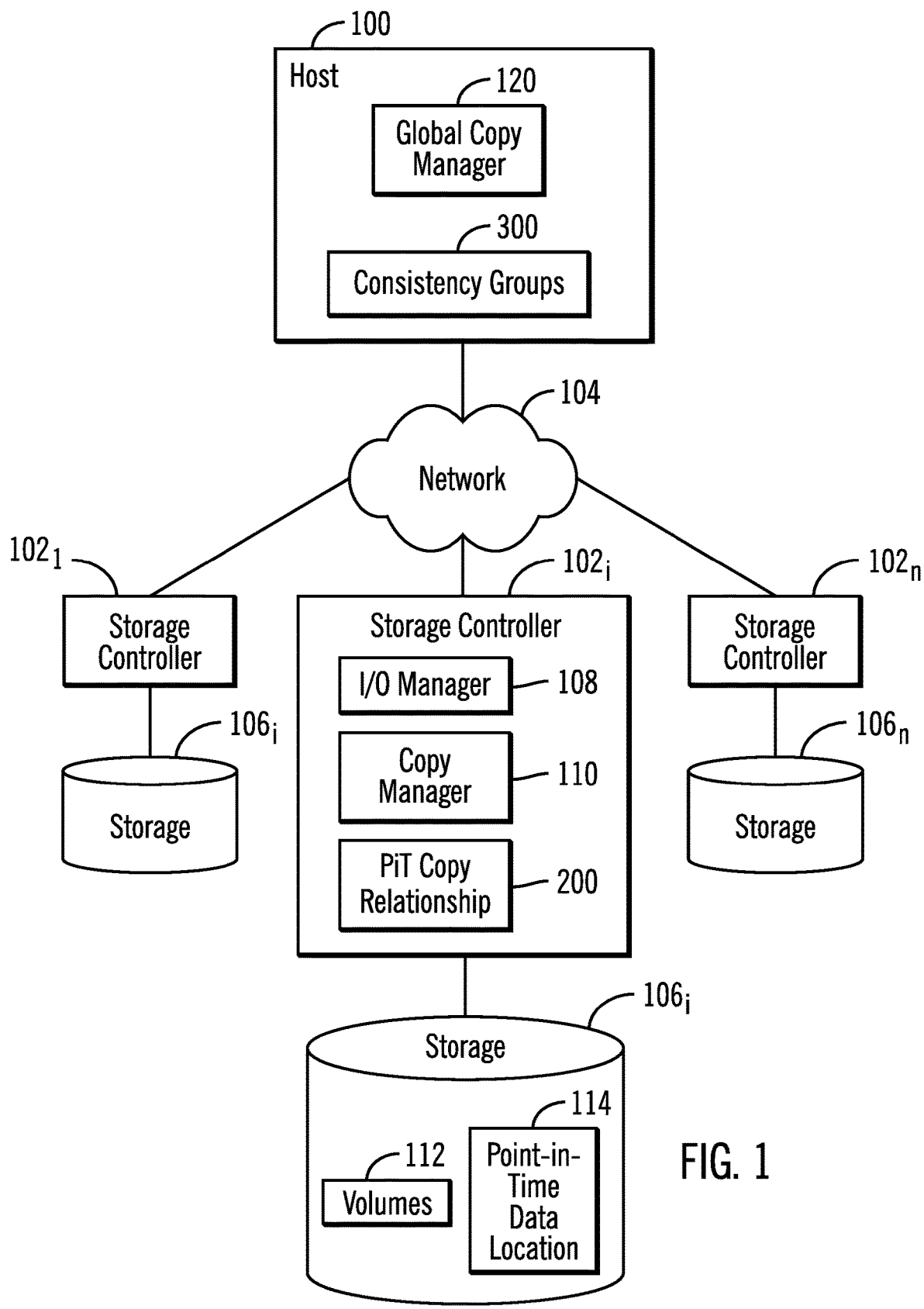
FIG. 1 illustrates an embodiment of a backup storage environment.

FIG. 1 illustrates an embodiment of a data backup environment having a host system 100 that is connected to a plurality of storage controllers $102_1 \ldots 102_i \ldots 102_n$ over a network 104, each storage controller $102_1 \ldots 102_i \ldots 102_n$ managing access to volumes configured in logical subsystems in the storages $106_1 \ldots 106_i \ldots 106_n$, respectively. There may be additional hosts (not shown) that provide Input/Output (I/O) requests to the storage controllers $102_1 \ldots 102_i \ldots 102_n$. Each of the storage controllers $102_1 \ldots 102_i \ldots 102_n$ include components as shown with respect to storage controller $102_i$, including an I/O manager 108 to manage I/O operations directed to the storage 106i, a copy manager 110 to manage copy operations, such as creating point-in-time copies, such as a snapshot, Flash-Copy® (FlashCopy is a registered trademark of IBM), snapshot, etc. The copy manager 110 creates point-in-time copy relationships 200, where each point-in-time copy relationship $200_i$ represents a point-in-time copy of one or more volumes 112 configured in the storage $106_i$. The copy manager 110 stores point-in-time data for a point-in-time copy $200_i$ in point-in-time data location 114, which may store point-in-time data, comprising data for a point-in-time copy $200_i$ before the data is updated while the point-in-time copy $200_i$ is open. The point-in-time data location 114 may comprise a log file to store point-in-time data from multiple point-in-time copies 200 or comprise other types of files or data structures to store the point-in-time data for a point-in-time copy $200_i$.

There may be separate point-in-time data location 114 instances, such as a log, for multiple point-in-time copies of a same volume 112 to allow recovery of the volume 112 at different points-in-time.

The storage $106_i$ includes volumes 112, where volumes may be configured in Logical Subsystems (LSS), where each LSS is comprised of multiple volumes 112. The term volume 112 as used herein may refer to other types of storage units comprising addressable ranges of data, such as logical devices, logical drives, partitions, etc.

The host 100 includes a global copy manager 120 to maintain consistency groups 300, where each consistency group $300_i$ provides a point-in-time copy extending across volumes 112 in different storage controllers $102_1 \ldots 102_i \ldots 102_n$.

The storage controllers $102_1 \ldots 102_i \ldots 102_n$ may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

The network 104 may comprise a Storage Area Network (SAN), Local Area Network (LAN), Intranet, the Internet, Wide Area Network (WAN), peer-to-peer network, wireless network, arbitrated loop network, etc. The storages $106_1 \ldots 106_i \ldots 106_n$ may each be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random dom access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storage $106_i$ may comprise heterogeneous storage devices from different vendors and different types of storage devices, such as a first type of storage devices, e.g., hard disk drives, that have a slower data transfer rate than a second type of storage devices, e.g., SSDs.

Figure 2:
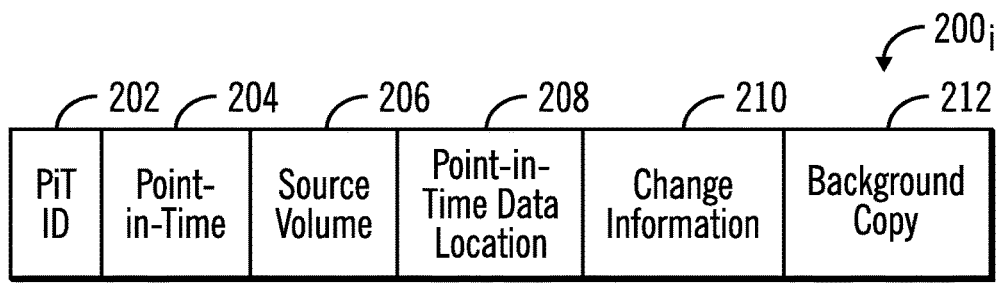
FIG. 2 illustrates an embodiment of a point-in-time copy relationship.

FIG. 2 illustrates an embodiment of an instance of a point-in-time (PiT) copy relationship $200_i$ (also referred to as a point-in-time copy) as including a point-in-time identifier 202; a point-in-time 204 or timestamp of the consistency group point-in-time 304; a source volume 206 from which data is copied; a point-in-time data location 208 indicating where the point-in-time data in the source volume 206 is copied before being updated while the point-in-time copy 202 is open, which may comprise a log file 114; change information 210, such as a change recording bitmap, indicating each data unit (e.g., track, block logical block address, etc.) in the source volume 206 that has been modified and not yet copied to the point-in-time data location 208; a background copy flag 212 to indicate whether there is a background copy operation to mirror the point-in-time copy to a secondary storage system.

A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the point-in-time data location 114.

Figure 3:
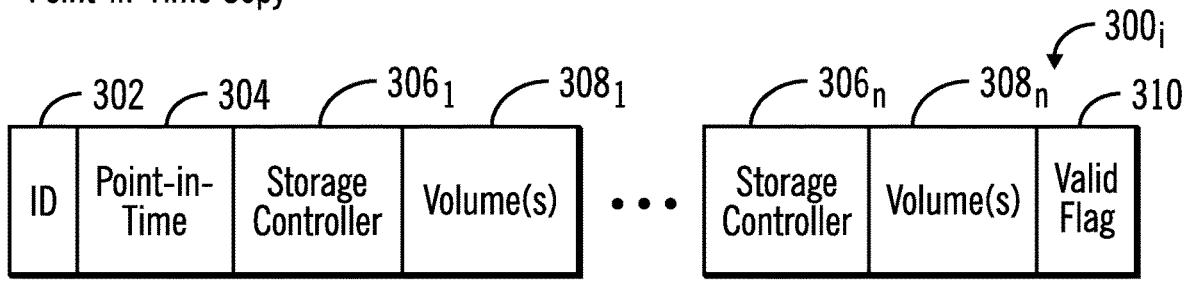
FIG. 3 illustrates an embodiment of a consistency group.

FIG. 3 illustrates an embodiment of a consistency group $300_i$ providing a point-in-time consistency group including multiple volumes 112 across one or more storage controllers $102_1 \ldots 102_i \ldots 102_n$, and includes a consistency group identifier 302, which may comprise a sequence number in a series of consistency groups being formed; a point-in-time 304 of the consistency group 302, which may be specified when the consistency group $300_i$ is first created; and one or more storage controllers $306_1 \ldots 306_n$ having volumes $308_1 \ldots 308_n$ included in the consistency group 302; and a valid flag 310 indicating whether the consistency group 302 is valid or invalid. A valid consistency group $300_i$ is a consistency group where point-in-time copies $200_i$ were successfully initialized for all volumes $308_1 \ldots 308_n$ in the consistency group $300_i$, where an invalid consistency group $300_i$ is one where the point-in-time copy $200_i$ for at least one of the volumes $308_1 \ldots 308_n$ failed.

The consistency group point-in-time 304 comprises the point-in-time 204 in all the point-in-time copies $200_i$ for the volumes $308_1 \ldots 308_n$ included in the consistency group $300_i$. In this way, the consistency group $300_i$ represents multiple individual point-in-time copies $200_i$ for volumes $308_1 \ldots 308_n$ in the consistency group $300_i$ that implement the consistency group $300_i$. A consistency group $300_i$ may indicate one or more volumes $308_i$ in one or more storage controllers $306_i$. In one embodiment, the volume(s) data structure $308_i$ may comprise a bitmap having a bit for each possible volume in the storage controller $306_i$, with a bit in the bitmap set to one value to indicate the volume corresponding to the bit is included in the consistency group $300_i$, and set to another value to indicate the volume at the storage controller $306_i$ is not included in the consistency group.

Figure 4:
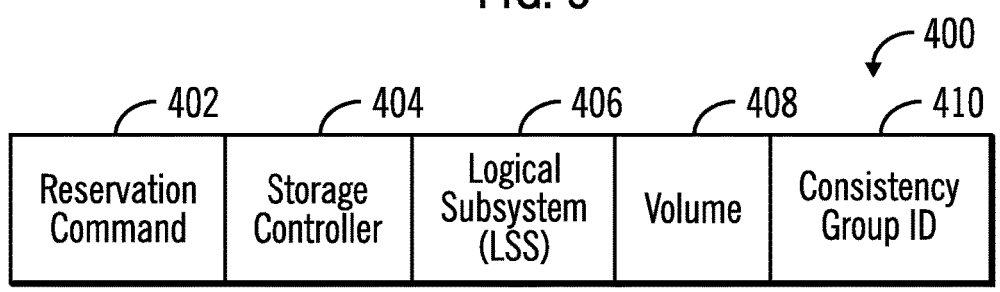
FIG. 4 illustrates an embodiment of a reservation command.

FIG. 4 illustrates an embodiment of a reservation command 400 the global copy manager 120 sends to each storage controller $306_i$ for each volume $308_i$ in the consistency group $300_i$ to cause the storage controller $306_i$ to prepare and reserve resources for a point-in-time copy $200_i$, which reservation operations performed at the storage controller $306_i$ may comprise creating the point-in-time copy $200_i$ data structures, including $200_i$ and the change information bitmap 210, make sure resources are available, such as in the point-in-time data location 208, and to destage modified data for the source volume 206 in a cache of the storage controller $306_i$ to the storage $106_i$ as of the point-in-time 304 of the consistency group. The reservation command 400 may include a reservation command 402 operation code; the storage controller 404, such as a network address, to which the command 400 is directed; the logical subsystem 406 include the volume 408 for which the resources are to be reserved; and the consistency group ID 410 of the consistency group for which the resources are being reserved. In one embodiment, the global copy manager 120 may send to a storage controller $306_i$ one reservation command 400 for each volume $308_i$ in the consistency group $300_i$ being created that is maintained by that storage controller $306_i$.

Figure 5:
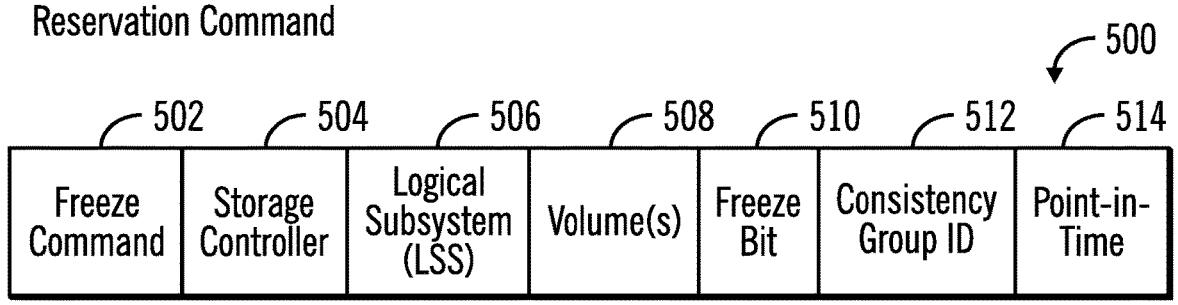
FIG. 5 illustrates an embodiment of a freeze command.

FIG. 5 illustrates an embodiment of freeze command 500, also referred to as a check-in command, that the global copy manager 120 sends after receiving confirmation that all the reservation commands completed successfully for all the volumes $308_1 \ldots 308_n$ included in the consistency group $300_i$. The freeze command 500 includes a freeze command 502 operation code; a storage controller 504 to which the freeze command is directed; a logical subsystem 506 including the one or more volumes 508 in the consistency group $300_i$ to freeze; a freeze bit 510 indicating to suspend I/O requests toward the volumes 508; the consistency group ID 512 of the consistency group for which the resources are being reserved; and a point-in-time 514 of the consistency group $300_i$, which is the time the freeze command 500 is sent. The point-in-time 204 will be used in all the point-in-time copies 200 created for the consistency group $300_i$. In one embodiment, the volumes 508 may comprise a bitmap including a bit for each possible volume in the logical subsystem 506 having bits set to indicate which volumes to freeze. In this way, a single freeze (check-in) command 500 is used to causes suspension of I/O operations at all volumes in a logical subsystem 506 maintained by the storage controller 504 that are in the consistency group 512 being created.

With the embodiment of FIG. 5, the point-in-time 204, 304 of the consistency group and point-in-time copies is determined when the freeze (check-in) command is sent, after the reservation operations are completed. In this way, the point-in-time is set when all updated data is destaged to the storage $106_i$ and previous point-in-time versions of data in the storage $106_i$ is saved off to the point-n-time data location 114.

Figure 6:
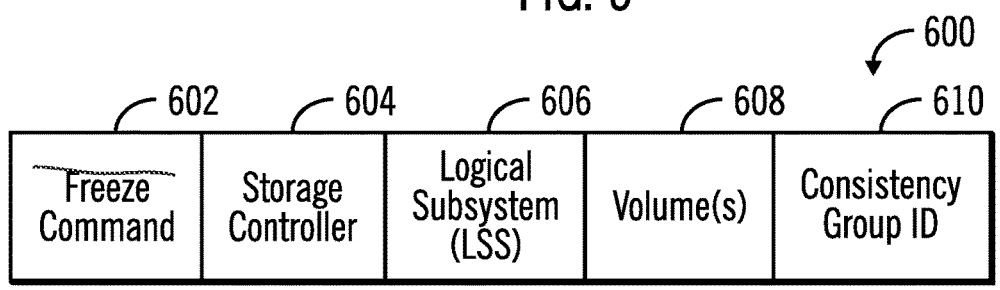
FIG. 6 illustrates an embodiment of a thaw command.

FIG. 6 illustrates an embodiment of a thaw command 600, also referred to as a consistency group created command, that the global copy manager 120 sends after receiving confirmation that all the freeze commands 500 completed successfully for all the volumes $308_1 \ldots 308_n$ included in the consistency group $300_i$. The thaw command 600 includes a thaw command 602 operation code; a storage controller 604 to which the thaw command is directed; a logical subsystem 606, configured by the storage controller 504, including the one or more volumes 608 in the consistency group $300_i$ to thaw; and the consistency group ID 610 of the consistency group for which the I/O operations are being resumed. In one embodiment, the volumes 608 may comprise a bitmap including a bit for each possible volume in the logical subsystem 606 having bits set to indicate which volumes to unfreeze, i.e., resume I/O operations. In this way, a single thaw command 602 is used to end suspension of I/O operations and allow I/O operations to proceed at all volumes in a logical subsystem 606 maintained by the storage controller 604 that are in the consistency group 610 being created.

In one embodiment, the point-in-time 204, 304 in the point-in-time copies $200_i$ for the volumes $308_1 \ldots 308_n$ at the storage controllers $306_1 \ldots 306_n$ may be set when the freeze command 500 is sent. In alternative embodiments, the point-in-time 204, 304, 514 for the consistency group $300_i$ and point-in-time copies 200 may be set at other times.

Figure 7:
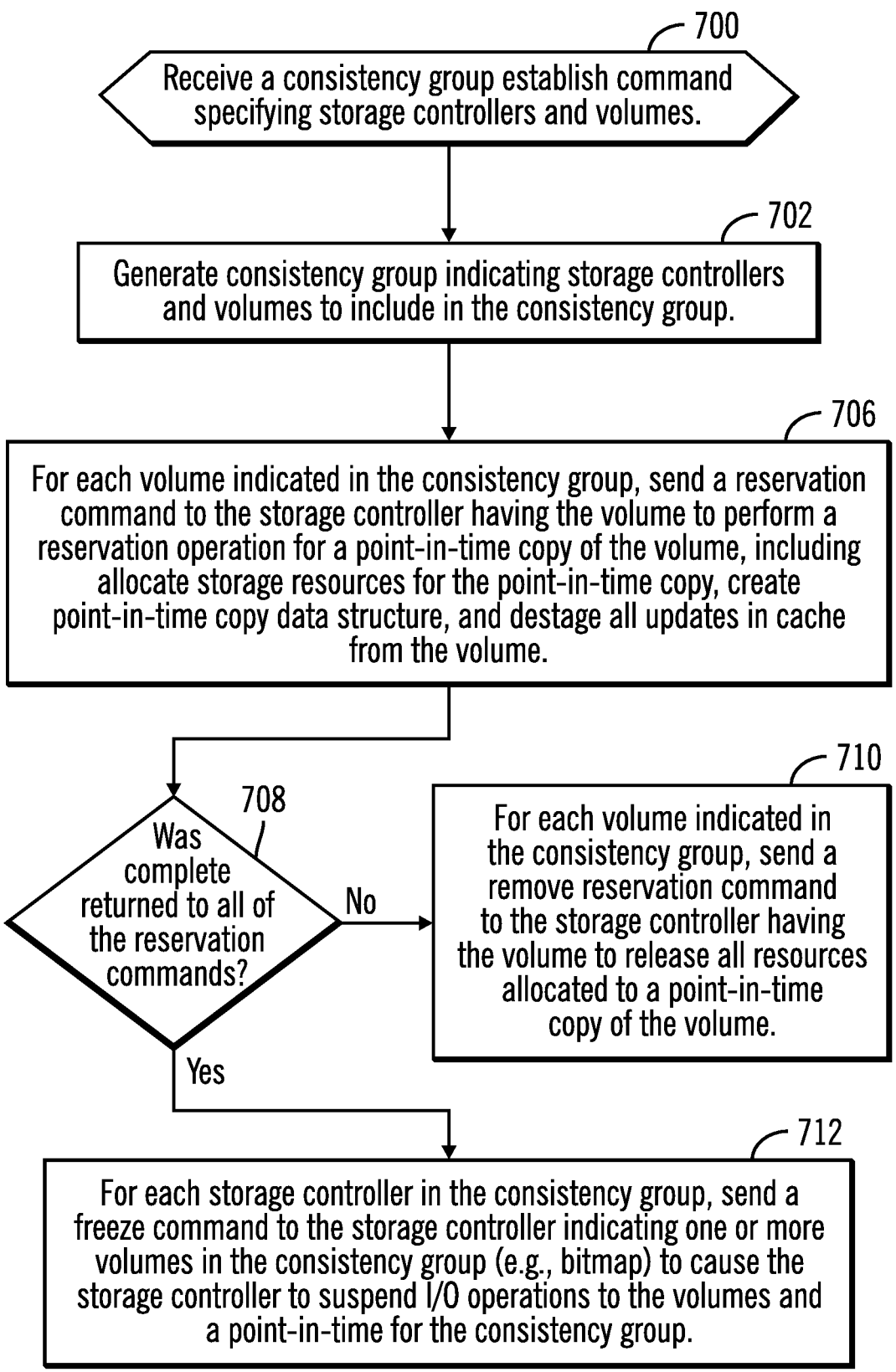
FIG. 7 illustrates an embodiment of operations to create a consistency group.

FIG. 7 illustrates an embodiment of operations performed by the global copy manager 120 to form a consistency group $300_i$ to maintain volumes 112 across storage controllers $102_i$ consistent as of a same point-in-time. Upon receiving (at block 700) a consistency group establish command specifying one or storage controllers $102_i$, multiple volumes 112 in one or more of the specified storage controllers $102_i$, and a consistency group point-in-time, the global copy manager 120 generates (at block 700) a consistency group $300_i$ specifying storage controllers $306_1 \ldots 306_n$ and volumes $308_1 \ldots 308_n$ to include in the consistency group $300_i$. The received consistency group establish command may be sent manually by a user through a computer user interface or automatically by a computer program as part of operations to periodically generate a succession of consistency groups $300_i$ to maintain multiple recovery points for the volumes $308_1 \ldots 308_n$. For each volume $308_i$ indicated in the consistency group $300_i$, the global copy manager 120 sends (at block 706) a reservation command 400 to the storage controller 404 having the volume 408 to perform a reservation operation for a point-in-time copy of the volume 408, including allocate storage resources for the point-in-time copy, create the point-in-time copy relationship $200_i$ data structure, and destage all updates in a cache of the storage controller 404 for the volume 408 to the storage $106_i$. The destaging of the updates in the cache will cause the tracks in the storage $106_i$ to which the updates are destaged to be copied to the point-in-time data location 114.

After sending (at block 706) reservation commands 400 for all volumes $308_1 \ldots 308_n$ in the consistency group $300_i$, the global copy manager 120 determines (at block 708) whether complete was returned for all the reservations commands. If not, i.e., the reservation command failed at one or more volumes, then, for each volume $308_1 \ldots 308_n$ indicated in the consistency group $300_i$, the global copy manager 120 sends (at block 710) a remove reservation command to the storage controller $102_i$ having the volume 112 to release all resources allocated to a point-in-time copy $200_i$ of the volume 112. For the reservation command 400 and the remove reservation command, one command may be sent to the storage controller $306_i$ for each volume $308_i$ to reverse the effect of any resource allocation at the storage controller $306_i$. Further, if the reservation command 400 has not been received for a volume for which the remove reservation command was sent, then the remove reservation command will be ignored. If (at block 708) complete was returned to all of the reservation commands 400 sent, then the global copy manager 120 sends (at block 712), for each storage controller $306_i$ in the consistency group $300_i$, a freeze command 500 to the storage controller $306_i$ indicating one or more volumes $308_i$ in the consistency group (e.g., bitmap) to cause the storage controller $306_i$ to suspend I/O operations to the indicated one or more volumes $308_i$. The freeze command 500 further includes a point-in-time 514 comprising the point-in-time of the consistency group $300_i$. In this way, the point-in-time 304 of the consistency group is set when sending the freeze command 500.

With the embodiment of FIG. 7, the global copy manager 120 will reverse the effect of the resource allocation during reservations and terminate the consistency group if reservation fails at any volume in the consistency group. If reservation succeeds for all volumes in the consistency group $300_i$, then formation of the consistency group will continue.

Figure 8:
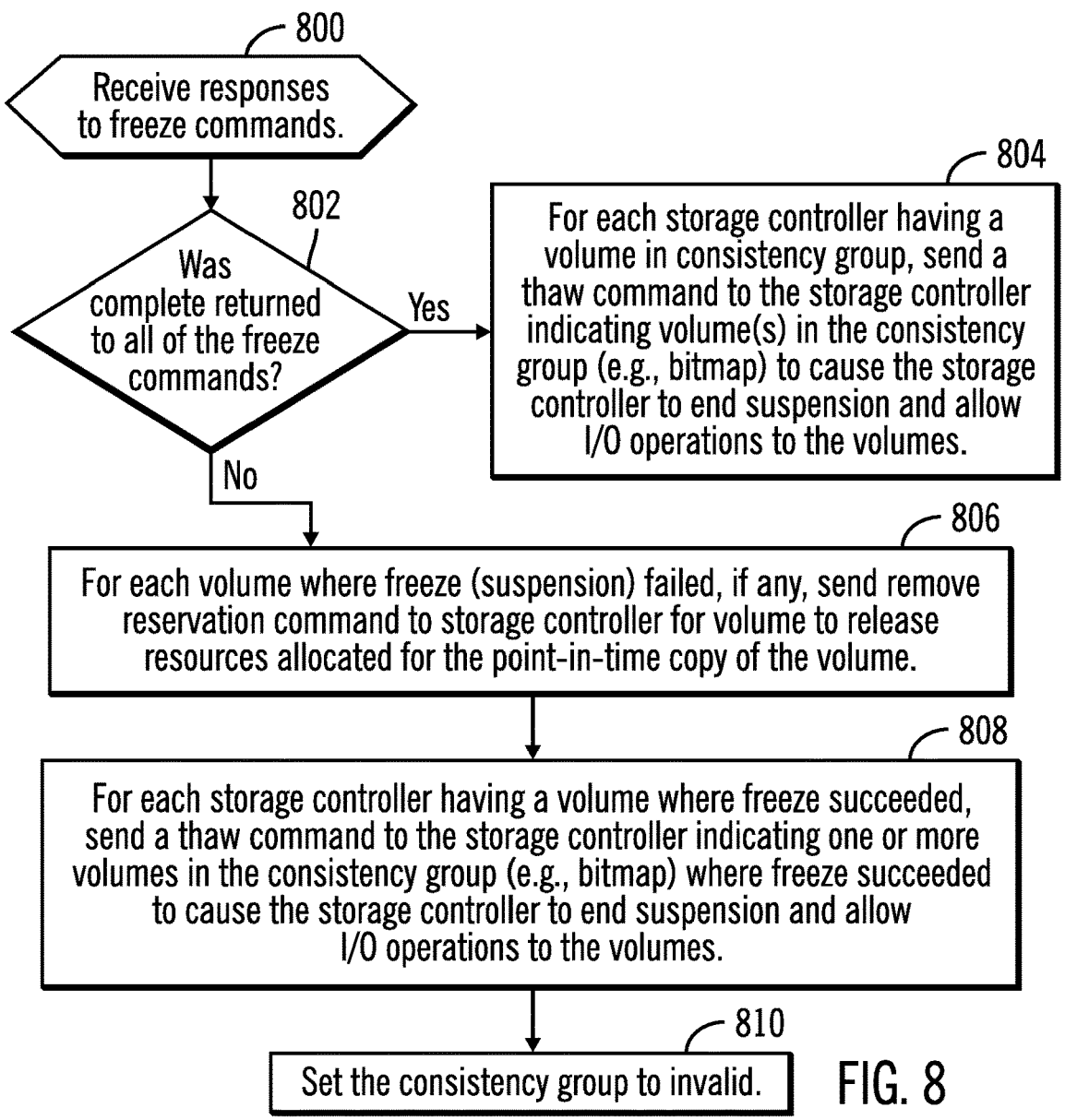
FIG. 8 illustrates an embodiment of operations to process responses to freeze commands as part of creating the consistency group.

FIG. 8 illustrates an embodiment of operations performed by the global copy manager 120 to process responses (at block 800) to the freeze commands 500 sent to the storage controllers $306_1 \ldots 306_n$. If (at block 802) complete was returned to all of the freeze commands 500, then, for each storage controller $306_i$ having a volume in the consistency group $300_i$, the global copy manager 120 sends (at block 804) a thaw command 600 to the storage controller $306_i$ indicating volume(s) $308_i$ in the consistency group (e.g., bitmap) to cause the storage controller $306_i$ to end the suspension and allow I/O operations to proceed to the volumes. This allows the point-in-time copies $200_i$ forming the consistency group $300_i$ to be activated and begin forming the next consistency group.

If (at block 802) complete was not returned to all of the sent freeze commands 500, then, for each volume $308_i$ where freeze (suspension) failed, if any, the global copy manager 120 sends (at block 806) a remove reservation command to the storage controller $306_i$ for the volume failing to freeze to release resources allocated for the point-in-time copy $200_i$ of the volume created for the consistency group. For each storage controller $306_i$ having a volume $308_i$ where the freeze succeeded, the global copy manager 120 sends (at block 808) a thaw command 600 to the storage controller $306_i$ indicating one or more volumes $308_i$ in the consistency group (e.g., bitmap) where freeze succeeded to cause the storage controller to end suspension and allow I/O operations to the volumes. The consistency group $300_i$ valid flag 310 is set (at block 810) to indicate the consistency group $300_i$ is invalid because the local point-in-time copy $200_i$ cannot be created for all the volumes in the consistency group.

With embodiment of FIG. 8, if the freeze operation fails for any of the volumes $308_i$ in the consistency group $300_i$, then the consistency group $300_i$ is marked as invalid in valid flag 310. However, for those volumes in the consistency group for which the freeze command succeeded, the global copy manager 120 will allow the point-in-time copies $200_i$ to proceed for specific volumes in the consistency group $300_i$, but fail the consistency group $300_i$ as a whole.

Figure 9:
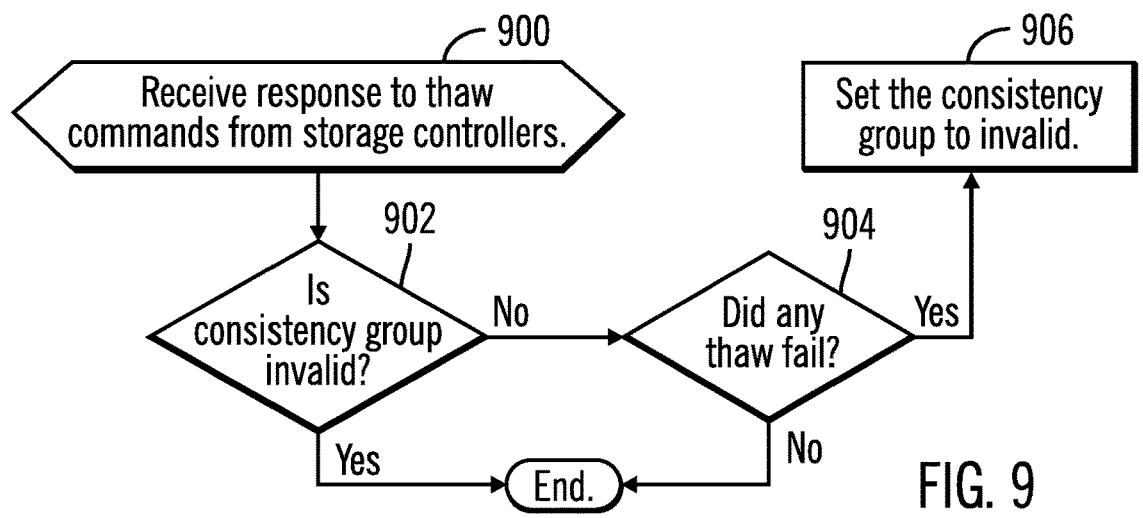
FIG. 9 illustrates an embodiment of operations to process responses to thaw commands as part of creating the consistency group.

FIG. 9 illustrates an embodiment of operations performed by the global copy manager 120 to process the response to the thaw commands 600. Upon receiving (at block 900) a response to the thaw commands 600 sent to the one or more storage controllers $306_i$ for the one or more frozen volumes $308_i$, if (at block 902) the consistency group $300_i$ is invalid, as indicated in the valid flag 310, then control ends. If (at block 902) the consistency group $300_i$ is not invalid, then if (at block 904) any thaw command 600 failed, then the global copy manager 120 sets the consistency group $300_i$ to invalid, by indicating invalid in the valid flag 310.

With the embodiment of FIG. 9, failure of any thaw command 600 causes the failure of the consistency group $300_i$ as a whole, but the point-in-time copies $200_i$ for volumes in the consistency group $300_i$ where the thaw successfully completed are allowed to remain in effect to create local point-in-time copies $200_i$ for the individual volume elements of the consistency group $300_i$.

The embodiments of FIGS. 7, 8, and 9 allow the global copy manager 120 to synchronize the creation of the local point-in-time copies $200_i$ for all the volumes $308_1 \ldots 308_n$ in the consistency group $300_i$. In this way, the consistency group $300_i$ is formed and generated by maintaining separate point-in-time copies $200_i$ for each volume defined in the consistency group $300_i$. The global copy manager 120 may manage the reservation, check-in (freeze), and thaw (unfreeze) operations to ensure that all the volumes $308_1 \ldots 308_n$ in the consistency group $300_i$ have active point-in-time copies $200_i$ operable to maintain the point-in-time data for the consistency group $300_i$. Further, if the establishment of the point-in-time copy for any volume $308_i$ in the consistency group $300_i$ fails, then the consistency group $300_i$ is marked as invalid, but the local point-in-time copies $200_i$ that were successfully established may be allowed to remain in effect to create the point-in-time copy for a subset of the volumes in the consistency group $300_i$.

In the described embodiment, variables i, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
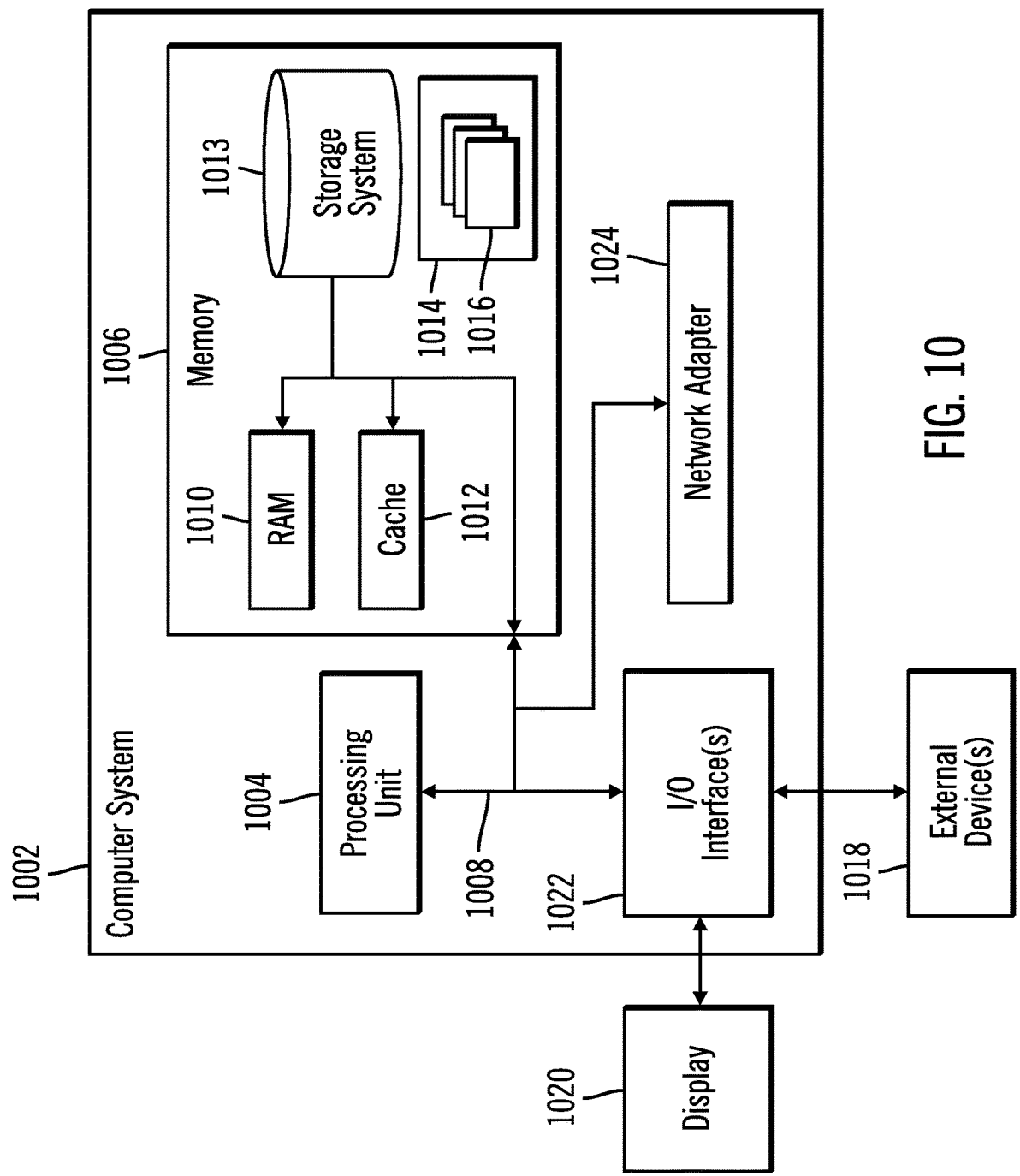
FIG. 10 illustrates a computing environment in which the components of FIG. 1 may be implemented.

The computational components of FIG. 1, including the storage controller 102$_1$, 102$_i$ . . . 102$_n$ and host 100 may be implemented in one or more computer systems, such as the computer system 1002 shown in FIG. 10. Computer system/ server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for creating point-in-time copies for storage units managed by at least one storage controller, wherein the computer program product comprises a computer readable storage medium having program instructions embodied therewith, the program instructions executable by a processor to cause operations, the operations comprising:
   causing the at least one storage controller to perform reservation operations for point-in-time copies of storage units, wherein a reservation operation allocates storage resources and a data structure for a point-in-time copy;
   determining whether the reservation operations successfully completed for all the point-in-time copies;
   causing suspension of Input/Output (I/O) operations to the storage units of the point-in-time copies in response to determining that all of the reservation operations for all of the point-in-time copies successfully completed;
   determining whether I/O operations were successfully suspended at the storage units for all of the point-in-time copies; and
   causing an end to the suspension of I/O operations and allow I/O operations to continue at the storage units of the point-in-time copies in response to determining that I/O operations were successfully suspended at the storage units for all the point-in-time copies; and
   forming the point-in-time copies at the storage units at which the suspension of I/O operations was ended after being successfully suspended, wherein the point-in-time copies are consistent as of a same point-in-time.

2. The computer program product of claim 1, wherein the operations further comprise:
   receiving a command to establish a consistency group for the storage units to have data consistent as of a point-in-time of the consistency group, wherein the consistency group is formed in response to forming the point-in-time copies at all of the storage units indicated in the command to establish the consistency group.

3. The computer program product of claim 2, wherein the operations further comprise:
   indicating the consistency group for the storage units as invalid in response to determining at least one of that the reservation operations one of the storage units did not successfully complete, that I/O operations were not successfully suspended at all of the storage units, and that I/O operations cannot proceed after successfully suspending I/O operations at one of the storage units.

4. The computer program product of claim 3, wherein a point-in-time copy is maintained for a storage unit in response to I/O operations proceeding at the storage unit after successfully suspending I/O operations at the storage unit while the consistency group including storage unit is indicated as invalid.

5. The computer program product of claim 1, wherein the causing the at least one storage controller to perform the reservation operations for the storage units comprises sending a reservation command for each of the storage units to the at least one storage controller managing access to the storage units to cause the reservation operations for the point-in-time copies of the storage units, wherein a reservation operation for a point-in-time copy includes destaging any updated data for a storage unit of the point-in-time copy in a cache of the storage controller to the storage unit.

6. The computer program product of claim 1, wherein the storage units comprise volumes in storages managed by multiple storage controllers, wherein the causing the suspension of the I/O operations comprises sending one freeze command to each storage controller of the storage controllers to cause the storage controller to suspend I/O operations at all of the volumes of the point-in-time copies maintained by the storage controller.

7. The computer program product of claim 6, wherein the freeze command includes a data structure indicating volumes managed by a storage controller that are subject to the freeze command to cause the storage controller to suspend I/O operations at all of the volumes indicated in the data structure as subject to the freeze command.

8. The computer program product of claim 1, wherein the storage units comprise volumes in storages managed by multiple storage controllers, wherein the causing the I/O operations to continue at the volumes comprises sending one thaw command to each storage controller of the storage controllers to cause the storage controller to end the suspension of I/O operations and to continue I/O operations at all of the volumes of the point-in-time copies maintained by the storage controller.

9. The computer program product of claim 8, wherein the thaw command includes a data structure indicating volumes managed by a storage controller that are subject to the thaw command to cause the storage controller to end the suspension of I/O operations and to continue I/O operations at the volumes indicated in the data structure as subject to the thaw command.

10. The computer program product of claim 8, wherein the thaw command indicates a point-in-time comprising the point-in-time at which the point-in-time copies are consistent.

11. The computer program product of claim 8, wherein the operations further comprise:
   for each point-in-time copy for a storage unit at which the suspension of the I/O operations failed or processing of the thaw command failed, sending a command to cause a storage controller managing the storage unit to free any resources reserved as part of a reservation operation for the point-in-time copy at which the suspension of the I/O operations failed or the processing of the thaw command failed.

12. The computer program product of claim 1, for each point-in-time copy for a storage unit at which the suspension of the I/O operations succeeded, sending a thaw command to cause I/O operations to cease the suspension of I/O operations and allow I/O operations to proceed at the storage unit of the point-in-time copy at which I/O operations were successfully suspended.

13. A system for creating point-in-time copies for storage units managed by at least one storage controller, comprising:
   a processor; and
   a computer readable storage medium having program instructions embodied therewith, the program instructions executed by the processor to perform operations, the operations comprising:
      causing the at least one storage controller to perform reservation operations for point-in-time copies of storage units, wherein a reservation operation allocates storage resources and a data structure for a point-in-time copy;

determining whether the reservation operations successfully completed for all the point-in-time copies;

causing suspension of Input/Output (I/O) operations to the storage units of the point-in-time copies in response to determining that all of the reservation operations for all of the point-in-time copies successfully completed;

determining whether I/O operations were successfully suspended at the storage units for all of the point-in-time copies; and causing an end to the suspension of I/O operations and allow I/O operations to continue at the storage units of the point-in-time copies in response to determining that I/O operations were successfully suspended at the storage units for all the point-in-time copies; and forming the point-in-time copies at the storage units at which the suspension of I/O operations was ended after being successfully suspended, wherein the point-in-time copies are consistent as of a same point-in-time.

14. The system of claim 13, wherein the operations further comprise:

receiving a command to establish a consistency group for the storage units to have data consistent as of a point-in-time of the consistency group, wherein the consistency group is formed in response to forming the point-in-time copies at all of the storage units indicated in the command to establish the consistency group.

15. The system of claim 14, wherein the operations further comprise:

indicating the consistency group for the storage units as invalid in response to determining at least one of that the reservation operations one of the storage units did not successfully complete, that I/O operations were not successfully suspended at all of the storage units, and that I/O operations cannot proceed after successfully suspending I/O operations at one of the storage units.

16. The system of claim 13, wherein the storage units comprise volumes in storages managed by multiple storage controllers, wherein the causing the suspension of the I/O operations comprises sending one freeze command to each storage controller of the storage controllers to cause the storage controller to suspend I/O operations at all of the volumes of the point-in-time copies maintained by the storage controller.

17. The system of claim 16, wherein the freeze command includes a data structure indicating volumes managed by a storage controller that are subject to the freeze command to cause the storage controller to suspend I/O operations at all of the volumes indicated in the data structure as subject to the freeze command.

18. The system of claim 13, wherein the storage units comprise volumes in storages managed by multiple storage controllers, wherein the causing the I/O operations to continue at the volumes comprises sending one thaw command to each storage controller of the storage controllers to cause the storage controller to end the suspension of I/O operations and to continue I/O operations at all of the volumes of the point-in-time copies maintained by the storage controller.

19. The system of claim 13, for each point-in-time copy for a storage unit at which the suspension of the I/O operations succeeded, sending a thaw command to cause I/O operations to cease the suspension of I/O operations and allow I/O operations to proceed at the storage unit of the point-in-time copy at which I/O operations were successfully suspended.

20. A method for creating point-in-time copies for storage units managed by at least one storage controller comprising:

causing at least one storage controller to perform reservation operations for point-in-time copies of storage units, wherein a reservation operation allocates storage resources and a data structure for a point-in-time copy;

determining whether the reservation operations successfully completed for all the point-in-time copies;

causing suspension of Input/Output (I/O) operations to the storage units of the point-in-time copies in response to determining that all of the reservation operations for all of the point-in-time copies successfully completed;

determining whether I/O operations were successfully suspended at the storage units for all of the point-in-time copies;

causing an end to the suspension of I/O operations and allow I/O operations to continue at the storage units of the point-in-time copies in response to determining that I/O operations were successfully suspended at the storage units for all the point-in-time copies; and forming the point-in-time copies at the storage units at which the suspension of I/O operations was ended after being successfully suspended, wherein the point-in-time copies are consistent as of a same point-in-time.

21. The method of claim 20, further comprising:

receiving a command to establish a consistency group for the storage units to have data consistent as of a point-in-time of the consistency group, wherein the consistency group is formed in response to forming the point-in-time copies at all of the storage units indicated in the command to establish the consistency group.

22. The method of claim 21, further comprising:

indicating the consistency group for the storage units as invalid in response to determining at least one of that the reservation operations one of the storage units did not successfully complete, that I/O operations were not successfully suspended at all of the storage units, and that I/O operations cannot proceed after successfully suspending I/O operations at one of the storage units.

23. The method of claim 20, wherein the storage units comprise volumes in storages managed by multiple storage controllers, wherein the causing the suspension of the I/O operations comprises sending one freeze command to each storage controller of the storage controllers to cause the storage controller to suspend I/O operations at all of the volumes of the point-in-time copies maintained by the storage controller.

24. The method of claim 23, wherein the freeze command includes a data structure indicating volumes managed by a storage controller that are subject to the freeze command to cause the storage controller to suspend I/O operations at all of the volumes indicated in the data structure as subject to the freeze command.

25. The method of claim 20, wherein the storage units comprise volumes in storages managed by multiple storage controllers, wherein the causing the I/O operations to continue at the volumes comprises sending one thaw command to each storage controller of the storage controllers to cause the storage controller to end the suspension of I/O operations and to continue I/O operations at all of the volumes of the point-in-time copies maintained by the storage controller.

26. The method of claim 20, for each point-in-time copy for a storage unit at which the suspension of the I/O operations succeeded, sending a thaw command to cause I/O operations to cease the suspension of I/O operations and allow I/O operations to proceed at the storage unit of the point-in-time copy at which I/O operations were successfully suspended.

\* \* \* \* \*